United States Patent
Kozlowski et al.

(10) Patent No.: US 6,907,052 B2
(45) Date of Patent: Jun. 14, 2005

(54) TUNABLE OPTICAL LOCAL OSCILLATOR

(75) Inventors: David A. Kozlowski, Redondo Beach, CA (US); John P. Hurrell, Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 315 days.

(21) Appl. No.: 10/368,962

(22) Filed: Feb. 19, 2003

(65) Prior Publication Data

US 2004/0161250 A1 Aug. 19, 2004

(51) Int. Cl.[7] .................................................. H01S 3/13
(52) U.S. Cl. ...................... 372/29.011; 372/20; 372/26; 372/29.01
(58) Field of Search ................... 372/20, 26, 29.01, 372/29.011; 250/227.11, 205; 398/85, 183, 185

(56) References Cited

U.S. PATENT DOCUMENTS

| | | | | |
|---|---|---|---|---|
| 5,200,964 A | * | 4/1993 | Huber | 372/26 |
| 5,781,327 A | * | 7/1998 | Brock et al. | 372/94 |
| 5,917,179 A | * | 6/1999 | Yao | 250/227.11 |
| 5,929,430 A | * | 7/1999 | Yao et al. | 250/205 |
| 5,963,567 A | * | 10/1999 | Veselka et al. | 372/21 |
| 6,567,436 B1 | * | 5/2003 | Yao et al. | 372/32 |
| 6,661,976 B1 | * | 12/2003 | Gnauck et al. | 398/183 |
| 6,735,229 B1 | * | 5/2004 | Delfyett et al. | 372/38.08 |
| 6,839,363 B2 | * | 1/2005 | Lin et al. | 372/18 |
| 6,845,108 B1 | * | 1/2005 | Liu et al. | 372/20 |
| 2003/0058509 A1 | * | 3/2003 | Webb et al. | 359/187 |
| 2003/0063837 A1 | * | 4/2003 | Gupta et al. | 359/326 |
| 2004/0208583 A1 | * | 10/2004 | AzadeT et al. | 398/85 |

* cited by examiner

Primary Examiner—MinSun Oh Harvey
Assistant Examiner—Cornelius H. Jackson
(74) Attorney, Agent, or Firm—Derrick Michael Reid

(57) ABSTRACT

A tunable optical local oscillator is used for optical heterodyne signal detection using an electrooptic Mach-Zehnder modulator to produce a rapidly tunable optical signal from a tunable RF frequency generator. A combination of the Mach-Zehnder modulator and optical fibers for providing stimulated Brillouin scattering are used to suppress unwanted signals for providing a spectrally pure optical local oscillator waveform. Suppression of unwanted optical signals, up to 50 dB, generated by the Mach-Zehnder modulator is obtained, resulting in high spectral purity of the optical local oscillator waveform with an extended tuning range of the tunable optical oscillator equal to the operating bandwidth of up to 60 GHz of the Mach-Zehnder modulators.

16 Claims, 2 Drawing Sheets

TUNABLE OPTICAL LOCAL OSCILLATOR

TUNABLE OPTICAL LOCAL OSCILLATOR

OPTICAL OUTPUT SPECTRUM

US 6,907,052 B2

TUNABLE OPTICAL LOCAL OSCILLATOR

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of local oscillators and photonics. More particularly, the present invention relates to tunable optical local oscillators for photonic signal processing for use in photonic processing systems and optical communication systems.

BACKGROUND OF THE INVENTION

Most communication systems operating in the radio frequency (RF) domain have improved sensitivity and increased channel capacity based on heterodyne detection over existing direct detection. Unlike direct detection, heterodyne detection uses a local oscillator to extract the information from an input signal. At present, optical communication systems tend to use the simpler direct detection. The performance of a heterodyne detection system is the based on the accuracy of the local oscillator. For optical systems, current methods to generate an optical LO involve slow, 100 us to 1 ms, electronic, temperature, or mechanical tuning methods, which require complex feedback controls and wavelength referencing for oscillator wavelength accuracy. Alternatively, the optical systems use the flexibility of a Mach-Zehnder modulator to generate tunable sidebands on an optical carrier and then filter out the unwanted signals, such as unwanted sideband signals generated during modulation.

Methods to quickly, accurately, and reliably tune an optical local oscillator over the entire erbium doped optical fiber amplifier bandwidth are of importance to many optical systems. Local oscillators provide fine wavelength referencing in dense wavelength division multiplexed systems, signal down conversion in photonic signal processing, and frequency hopping in optical code division multiple access systems. Several techniques exist for the generation of tunable optical signals. Such techniques include the quasi-continuous tunable fiber ring laser and the generation of optical single sideband suppressed carrier signals using Mach-Zehnder modulators driven at quadrature.

Previous filtering approaches have relied on canceling signals that are in quadrature, a process that depends on careful amplitude and phase balance to suppress the unwanted signals. It is extremely difficult to maintain this signal cancellation over a wide frequency tuning range. The level of suppression of the unwanted signals is low and is frequency dependent using a Mach-Zehnder modulator that can have higher levels of suppression and can be made independent of frequency. While state-of-the-art Mach-Zehnder modulators have exhibited bandwidths up to 80 GHz, units with 60-GHz bandwidths can be purchased from commercial vendors. However, the signal phase for unwanted signal cancellation cannot be precisely maintained over this wide bandwidth. The Mach-Zehnder modulator cannot maintain an accurate phase for unwanted signal cancellation over a wide bandwidth. These and other disadvantages are solved or reduced using the invention.

SUMMARY OF THE INVENTION

An object of the invention is to provide unwanted optical signal suppression.

Another object of the invention is to provide unwanted optical signal suppression over the bandwidth of a Mach-Zehnder modulator.

Yet another object of the invention is to provide unwanted signal suppression over the bandwidth of a Mach-Zehnder modulator using Brillouin scattering in a recirculating optical ring having an optical fiber providing nonlinear optical scattering.

Still another object of the invention is to provide a Mach-Zehnder modulator driven by an RF local oscillator for providing an accurate tunable optical oscillator signal.

A further object of the invention is to provide a biased Mach-Zehnder modulator tuned by an RF local oscillator for providing an accurate tunable optical oscillator signal with carrier suppression.

The invention is directed to a tunable optical local oscillator that generates an optical local oscillator signal by passing an unmodulated optical carrier through a Mach-Zehnder modulator that is biased by a bias voltage and is tuned by an RF generator for providing a suppressed carrier double sideband signal. The bias voltage serves to suppress the carrier. The tunable RF local oscillator signal has a frequency $f_M$ that is applied to a Mach-Zehnder modulator for providing the double sideband signal frequency offset from a carrier signal. The output of the Mach-Zehnder modulator is an optical signal consisting of two tunable optical sideband signals of equal intensity that are separated by $\pm f_M$ from the fixed frequency optical carrier frequency $f_C$. When correctly biased by a bias voltage $V_B$, the unwanted carrier signal is suppressed, up to 50 dB. Once the carrier is suppressed, one of the two remaining sidebands is eliminated so as to provide a signal local oscillator output signal.

The two equal intensity sidebands are passed first though a filter that causes the intensities of the sideband signals to become unequal, preferably by firstly amplifying both sideband signals, and then bandpass attenuating the desired sideband signal that become the desired local oscillator output signal. The unequal intensity sideband signals are communicated through an optical fiber or other a nonlinear wave guided medium for isolating the lower intensity, but desired, sideband signal. The sideband signals are filtered so that the undesired sideband signal has an intensity above a Brillouin scattering threshold, while the other desired sideband signal is not. In the preferred form, the higher intensity sideband signal has a longer wavelength and the lower intensity sideband signal has a shorter wavelength. Brillouin backscattering can be realized using nonlinear optical waveguide medium, such as a wound optical fiber. The higher intensity sideband signal undergoes stimulated Brillouin scattering, and is then amplified and fed back into the wound optical fiber so as to cancel the undesired sideband signal the drops in intensity. The lower intensity desired sideband signal passes through the wound optical fiber with little or no loss as the desired optical local oscillator signal. In this manner, a precision single-frequency optical local oscillator signal is obtained at the shorter wavelength. Other unwanted harmonic optical signals appearing at multiples of $f_M$ and displaced in center frequency of the optical carrier produced by higher order stimulated Brillouin scattering processes are sufficiently separated in frequency from the optical local oscillator frequency, so as to be higher harmonics can filtered out, so as to provide a precision tunable optical LO signal with unwanted signal suppression over the operating bandwidth of the Mach-Zehnder modulator. These and other advantages will become more apparent from the following detailed description of the preferred embodiment.

DETAILED DESCRIPTION OF THE PREFERRED EMBODIMENT

Figure 1:
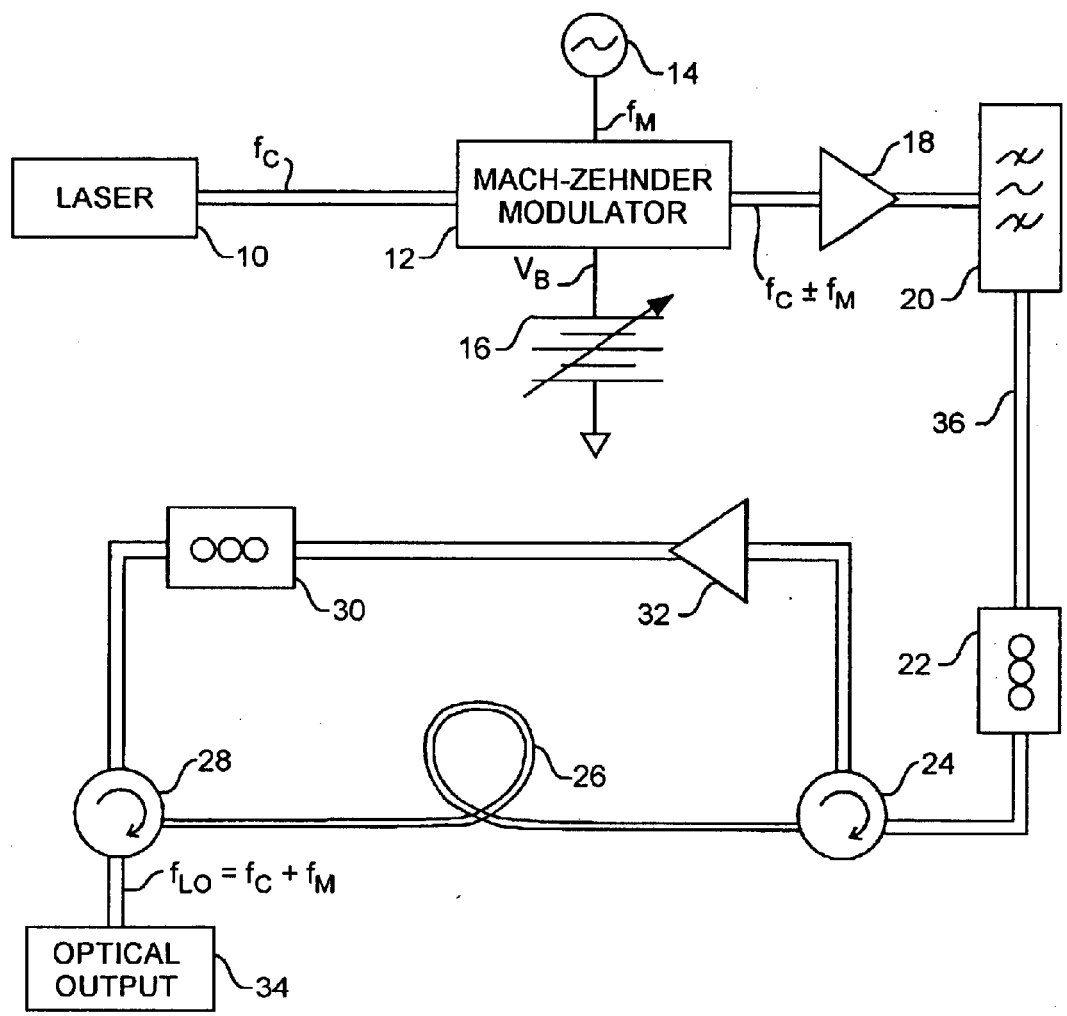
FIG. 1 is a block diagram of a tunable optical local oscillator.

An embodiment of the invention is described with reference to the figures using reference designations as shown in the figures. Referring to both the FIGS. 1 and 2, a tunable optical local oscillator includes a tunable laser 10 providing a laser beam to a Mach-Zehnder modulator 12. The laser beam has a carrier frequency of $V_C$ and preferably has a narrow linewidth of 100 kHz and is modulated by the Mach-Zehnder modulator 12. The Mach-Zehnder modulator 12 receives a tunable RF signal at a frequency $f_M$ from an RF signal generator 14. The Mach-Zehnder modulator 12 is biased at a zero transmission point by a bias voltage $V_B$ from a bias voltage source 16. The Mach-Zehnder modulator 12 produces an optical double sideband signal with a suppressed optical carrier, that is, the laser beam $f_C$ carrier is suppressed at the output Mach-Zehnder modulator 12 for providing two sideband signals displaced by $\pm f_M$ frequencies from the optical carrier frequency $f_C$. Hence, the optical double sideband signals include a shorter wavelength sideband signal at a short wavelength $C/(f_C+f_M)$, and a longer wavelength sideband signal at a long wavelength $C/(f_C-f_M)$, with both sideband signals having equal intensity, where C is the speed of light.

The optical double sideband signal from the Mach-Zehnder modulator 12 is amplified by a first erbium doped optical fiber amplifier 18 into an amplified double sideband signal. The amplifier double sideband signal is then fed into a tunable Fabry-Perot filter 20 that is centered on the longer but unwanted wavelength sideband signal. The undesired longer wavelength sideband signal is passed while the desired shorter wavelength sideband signal is attenuated so as to introduce power asymmetry between the longer and shorter wavelength sideband signals for providing an asymmetric optical double sideband signal. The amplifier 18 and filter 20 function together to effectively attenuate desired shorter wavelength signal. The asymmetric optical double sideband signal is fed into a first polarization controller 22 for providing a polarized asymmetric optical double sideband signal. The polarized asymmetric optical double sideband signal includes an undesired higher power and longer wavelength signal and a desired lower power and shorter wavelength signal. The polarization controller 22 and 30 serve to preserve a polarization orientation for matched polarization canceling of the forward and backward traveling waves around the laser ring.

The polarized asymmetric optical double sideband signal is fed into a Brillouin-erbium fiber laser ring for canceling out the undesired higher intensity and longer wavelength signal while passing the desired lower intensity and shorter wavelength signal. A Brillouin-erbium fiber laser ring includes the first optical circulator 24, the dispersion shifted single mode fiber 26, a second circulator 28, a second polarization controller 30, and a erbium doped fiber amplifier 32. The polarized asymmetric optical double sideband is fed into the laser ring by introducing the signal through the first optical circulator. The polarized asymmetric optical double sideband including the undesired longer wavelength signal and the desired shorter wavelength signal, is passed through a first optical circulator 24 into the dispersion shifted single mode fiber 26. The second circulator 28 of the Brillouin-erbium fiber then passes the desired shorter wavelength signal as an optical local oscillator output 34. The tunable optical local oscillator uses optical waveguide mediums, such as optical fibers 36 for communicating the optical signals through a tunable optical local oscillator and particularly through the Brillouin-erbium fiber laser ring.

When the higher power and longer wavelength sideband signal of the asymmetric double sideband signal is fed into the dispersion shifted signal mode fiber 26, the dispersion shifted signal mode fiber 26 generates a forward propagating acoustic grating signal and a backward traveling frequency downshifted Stokes wave as a backscattered signal as a backward traveling optical signal. The backscattered signal is a pumping source signal for the Brillouin-erbium fiber laser ring. The Brillouin-erbium fiber laser ring enhances the power of the Stokes shifted wave by amplification using the erbium doped fiber amplifier 32. The amplifier 32 amplifies the Stokes shifted wave into an amplified backscattered signal that fed into the second polarization controller 30 and routed through the second circulator 28 back to the dispersion shifted signal mode fiber 26 for canceling out the forward propagating acoustic grating signal thereby suppressing the undesired longer wavelength signal. In so functioning, the laser ring provides the desired shorter wavelength optical sideband signal as the optical local oscillator output 34. This optical local oscillator output 34 has a frequency that can be tuned by shifting the RF frequency $f_M$ from the RF generator 14 driving the Mach-Zehnder modulator 12.

Figure 2:
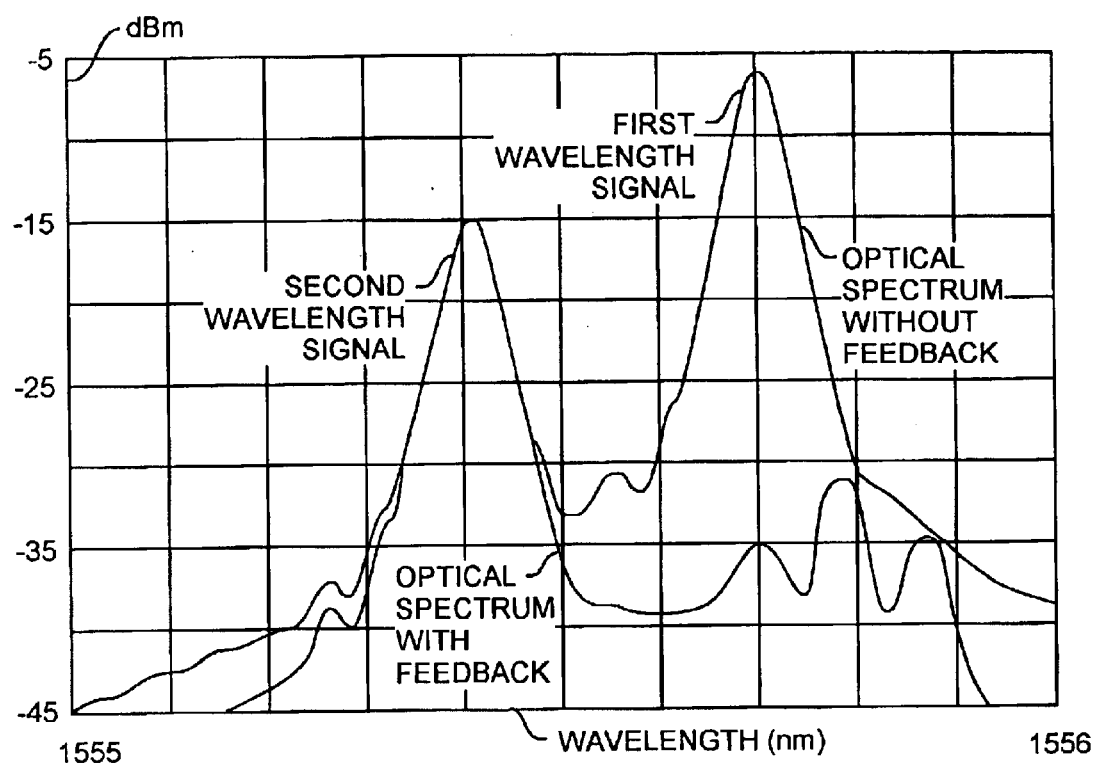
FIG. 2 is a graph of an optical output spectrum

Referring to both of the figures, and particularly to FIG. 2, the Mach-Zehnder modulator 12 provide a double sideband signal having a first longer wavelength signal and a second shorter wavelength, that are then adjusted in intensity for providing power asymmetry. The local oscillator output, with and without the laser ring being connected in a ring, is shown so as show the effect of the Brillouin-erbium fiber laser ring upon the asymmetric double sideband signal. When the laser ring is disconnected, for example, by open circuiting the optical fiber path between the amplifier 32 and the polarizer 30 in the laser ring, the optical local oscillator output contains both the first and second wavelength with power asymmetry as shown. When the laser ring is a closed ring, the higher power first wavelength signal is cancelled out as shown, resulting in the presence of only the desired second wavelength signal.

In the preferred form, the carrier frequency $f_C$ of the narrow linewidth distributed feedback tunable laser is modulated by the Mach-Zehnder modulator 12 that is driven by a RF signal generator 14 at a modulation frequency $f_M$ in the range 1.0 GHz to 20.0 GHz. The Mach-Zehnder modulator 12 is biased at $V_B$ by the bias voltage source 16 and provides the optical double sideband suppressed carrier signal at $f_C \pm f_M$ with about 40.0 dB to 50.0 dB of carrier suppression. The double sideband optical signal is fed into the first erbium doped optical fiber amplifier 18 and then into the tunable Fabry-Perot filter 20 having a bandwidth of 29.0 GHz and centered on the longer wavelength sideband signal that is the unwanted sideband signal. The unwanted sideband signal power is 5.0 dBm with an 8.0 dB of intensity asymmetry between the two sideband signals. The asymmetric optical double sideband signal is injected, using the polarization controller 22, into 12.7 km of the dispersion-shifted single-mode fiber 26 that has 0.21 dB/km attenuation, a mode field diameter of 8.8 $\mu$m, and an effective area of 60.8 $\mu m^2$. The higher power and longer wavelength sideband signal is an optical pumping signal that induces Brillouin scattering and generates the backward traveling Stokes shifted wave that is a downconverted signal, that is, offset from the carrier frequency by $f_M$ of 10.4 GHz at a wavelength 1556 nm. The Stokes shifted wave has a full width half-maximum linewidth of 9.0 MHz. The laser ring is a fiber ring cavity that suppresses the higher power sideband signal and passes the lower power sideband signal unattenuated. Without feedback, the longer wavelength and higher intensity sideband signal is present. With feedback, the longer wavelength and higher intensity sideband signal is suppressed, leaving the remaining lower intensity and shorter wavelength sideband signal. Hence, the tunable optical local oscillator suppresses the unwanted sideband signal while passing the desired sideband signal. The tunable optical local oscillator can provide up to 28.0 dB of optical sideband suppression and 16.0 dB optical spur-free dynamic range at 18.0 GHz. The performance at different frequencies can be measured by conventional optical heterodyne techniques. The biased Mach-Zehnder modulator offers optical carrier suppression for providing the two sideband signals without the carrier signal. The tunable optical local oscillator suppresses the laser optical carrier and suppresses the unwanted longer wavelength sideband signal. The noise floor remains constant and is set by the first erbium doped optical fiber amplifier 18. The sideband suppression increases with frequency and follows the transmission characteristic of the optical filter 20. Below 7.0 GHz, the ability of the optical filter to provide sideband asymmetry is greatly reduced, and the optical local oscillator signal begins to be suppressed. Above 18.0 GHz, the performance is limited by the frequency response of the Mach-Zehnder modulator. Homodyne measurements may confirm that the linewidth of the optical local oscillator followed that of the RF generator 14. The time evolution of the suppression of the unwanted optical sideband during pulsed operation of the tunable local oscillator can be measured. The time is measured from the start of a laser pulse from the laser 10. The sideband suppression is established in a time typically less than 100 us, and determined by a rise time for the stimulated Brillouin scattering. The initial suppression at time equal to zero is seen to increase as the off-time is reduced below a few milliseconds, corresponding to a long term memory caused by idler storage in the Brillouin erbium doped optical fiber amplifier recirculating laser ring. This transient behavior does not impact the continuous wave operation of the tunable optical local oscillator. The Stokes shifted wave is amplified by the second erbium doped optical fiber amplifier 32 and stored in the recirculating loop of the laser ring that is completed by feeding the Stokes shifted wave back into the output end of the fiber 26 through the second optical circulator 28 and polarization controller 30. This fed back Stokes shifted wave stored in the laser ring causes the higher intensity and longer wavelength sideband signal to be depleted and leaves the other lower intensity and shorter wavelength sideband signal unaffected through the laser ring. Hence, the unwanted longer wavelength sideband signal is firstly amplified by amplifier 18 to have a higher intensity than the desired shorter wavelength and lower intensity sideband signal, and then cancelled by backscattering in the laser ring for preserving the desired shorter wavelength and lower intensity sideband signal. The lower power level of the desired shorter wavelength sideband is below the threshold at which the Brillouin gain exceeds the losses around the laser ring, and the shorter wavelength sideband signal experiences normal attenuation and becomes the tunable optical local oscillator signal at the optical local oscillator frequency of $f_{LO}=f_C+f_M$. The process of pump depletion is self-limiting because the recirculating Stokes shifted wave becomes the pump for canceling a second Stokes shifted wave that propagates in the forward direction and limits further growth of the amplitude of the Stokes shifted wave.

The tunable optical local oscillator optically suppresses unwanted sideband signals to produce an RF tunable optical local oscillator signal. The resulting spectral purity of the output of the tunable optical local oscillator has many applications. Carrier suppression with a $V_B$ biased Mach-Zehnder modulator and sideband suppression using stimulated Brillouin scattering can produce high rejections of the unwanted signals for unwanted signal suppression. The remaining sideband signals created by higher-order Stokes shifted wave scattering are shifted by more than 20.0 GHz from the lower wavelength sideband signal and these remaining sideband signals can be filtered out, as desired. The optical local oscillator uses a laser ring that receives an asymmetric optical double sideband suppressed carrier input signal and suppresses the unwanted sideband signal using stimulated Brillouin scattering. The tunable optical local oscillator has a preferred tuning range of between 7.0 GHz and 20.0 GHz, with 20.0 dB to 28.0 dB of unwanted sideband suppression, with settling times that are less than 100 microseconds.

The tunable optical local oscillator can be used to generate a precision optical local oscillator signal for optical heterodyne signal detection. The tunable optical local oscillator uses an electrooptic biased Mach-Zehnder modulator to modulate a laser carrier signal. The Mach-Zehnder modulator is biased and driven by a tunable RF frequency to produce the double sideband signal with carrier suppression. The double sideband signal is filtered for providing the asymmetric double sideband signal having a higher intensity and longer wavelength sideband signal and a lower intensity and shorter wavelength sideband signal. Stimulated Brillouin scattering is used to suppress the higher intensity and longer wavelength sideband signal while passing the lower intensity and shorter wavelength sideband signal to produce a rapidly tunable optical signal at a constant optical frequency. The combination of the Mach-Zehnder modulator and stimulated Brillouin Scattering is used to suppress unwanted signals, such as the optical carrier and higher intensity and longer wavelength sideband signal for producing a spectrally pure optical local oscillator signal at the shorter wavelength. Greater than 50 dB suppression can be obtained, resulting in high spectral purity of the tunable optical local oscillator output signal. The tuning range of the tunable optical local oscillator is equal to the operating bandwidth of the Mach-Zehnder modulator.

The tunable optical local oscillator relies on Brillouin scattering in an optical fiber in a laser ring to preferably suppress one of the two sidebands of an optical double sideband and carrier suppressed signal. The frequency shifted back scattered Brillouin signal is stored in the feedback loop of the laser ring and reinjected to enhance the unwanted signal suppression and to provide fast settling times. The tunable optical local oscillator can use commercial components that are readily available. The tunable optical local oscillator provides an optical signal that can be rapidly tuned around a selectable wavelength. The tunable optical local oscillator can be used for spectral analysis of incoming signals either as part of a communication receiver or as a spectrum analyzer. The tunable optical local oscillator can also be used in transmitters such as in optical radar systems and optical communication systems. The tunable optical local oscillator can be used to provide chirped signals for radar, and provide multiple carrier signals for frequency hopping capabilities in densely populated communication channels. The tunable optical local oscillator can be configured using tunable lasers for providing differing optical carriers. Those skilled in the art can make enhancements, improvements, and modifications to the invention, and these enhancements, improvements, and modifications may nonetheless fall within the spirit and scope of the following claims.

What is claimed is:

1. A tunable optical local oscillator for providing an optical local oscillator signal, the tunable optical local oscillator comprising,
    a laser for providing an optical carrier having a carrier frequency,
    a Mach-Zehnder modulator for providing a double sideband signal having first wavelength signal at a first frequency and a second wavelength signal at a second frequency,
    an asymmetric means for asymmetric filtering of the double sideband signal for increasing the intensity of the first wavelength signal over the second wavelength signal for providing power asymmetry between the first wavelength signal and the second wavelength signal, and
    a laser ring for providing a backward traveling wave and a forward traveling wave of the first wavelength signal for feeding back the first wavelength signal, the backscattering serving to cancel the first wave length signal for passing the second wavelength signal as the optical local oscillator signal.

2. The tunable optical local oscillator of claim 1 further comprising,
    a tunable RF local oscillator for providing a modulation signal at a modulation frequency for tuning the Mach-Zehnder modulator to the double sideband signal.

3. The tunable optical local oscillator of claim 1 further comprising,
    a bias source for biasing the Mach-Zehnder modulator for suppressing the optical carrier of the double sideband signal.

4. The tunable optical local oscillator of claim 1 further comprising,
    a tunable RF local oscillator for providing a modulation signal at a modulation frequency for tuning the Mach-Zehnder modulator to the double sideband signal, and
    a bias source for biasing the Mach-Zehnder modulator for suppressing the optical carrier.

5. The tunable optical local oscillator of claim 1 further comprising,
    a tunable RF local oscillator for providing a modulation signal at a modulation frequency for tuning the Mach-Zehnder modulator to the double sideband signal, and
    a bias source for biasing the Mach-Zehnder modulator for suppressing the optical carrier, the first frequency being displaced below the carrier frequency by the modulation frequency, and the second frequency being displaced above the carrier frequency by the modulation frequency, the first wavelength signal being a longer wavelength signal having a long wavelength, the second wavelength signal being a shorter wavelength signal having a short wavelength shorter than the longer wavelength.

6. The tunable optical local oscillator of claim 1 wherein, the first wavelength signal has a first power intensity greater than a second power intensity of the second wavelength signal.

7. The tunable optical local oscillator of claim 1, wherein the asymmetric means comprises,
    a first erbium doped optical fiber amplifier for amplifying the double sideband signal into an amplified double sideband signal, the first wavelength signal is an amplified first wavelength signal having a first power intensity greater than a second power intensity of the second wavelength signal being an amplified second wavelength signal.

8. The tunable optical local oscillator of claim 1, wherein the asymmetric means comprises,
    a tunable Fabry-Perot filter centered on the first frequency for passing the first wavelength signal and for attenuating the second wavelength signal, the second wavelength signal having a low power intensity lower than a high power intensity of the first wavelength signal.

9. The tunable optical local oscillator of claim 1, wherein the asymmetric means comprises,
    an erbium doped optical fiber amplifier for amplifying the double sideband signal into an amplified double sideband signal, the first wavelength signal is an amplified first wavelength signal having a first power intensity greater than a second power intensity of the second wavelength signal being an amplified second wavelength signal, and
    a tunable Fabry-Perot filter centered on the first frequency for passing the amplified first wavelength signal and for attenuating the amplified second wavelength signal, the amplified second wavelength signal having a low power intensity lower than a high power intensity of the amplified first wavelength signal.

10. The tunable optical local oscillator of claim 1 wherein the laser ring comprises,
    a nonlinear optical waveguide for backscattering the first wavelength signal having an intensity above a threshold value for producing a backward traveling optical signal and for forward propagating the second wavelength signal, and
    a feedback circulator for feeding back the backward traveling optical signal to the nonlinear optical waveguide for canceling the first wavelength signal.

11. The tunable optical local oscillator of claim 1 wherein the laser ring comprises,
    a nonlinear optical waveguide for backscattering the first wavelength signal having an intensity above a threshold value into a backward traveling optical signal and for forward propagating the first wavelength signal and the second wavelength signal, and
    a feedback circulator for feeding back the backward traveling optical signal as a fedback backward traveling optical signal to the nonlinear optical waveguide for canceling the first wavelength signal.

12. The tunable optical local oscillator of claim 1 wherein, the laser ring is a Brillouin fiber laser ring.

13. The tunable optical local oscillator of claim 1 wherein, the laser provides stimulated Brillouin backscattering generating the backward traveling wave as a Stokes shifted wave.

14. The tunable optical local oscillator of claim 1 wherein the laser ring comprises,
    a nonlinear optical waveguide for backscattering the first wavelength signal having an intensity above a threshold value into a backward traveling optical signal and for forward propagating the first wavelength signal and the second wavelength signal, a feedback circulator for feeding back the backward traveling optical signal as a fedback backward traveling optical signal, an amplifier for amplifying the fedback backward traveling optical signal as an amplified backward traveling optical signal, the amplified backward traveling signal, and an output circulator for communicating the amplified backward traveling optical signal to the nonlinear optical waveguide and for passing the second wavelength as the optical local oscillator signal.

15. The tunable optical local oscillator of claim 1 wherein the laser ring comprises, a nonlinear optical waveguide for backscattering the first wavelength signal having an intensity above a threshold value into a backward traveling optical signal and for forward propagating the first wavelength signal and the second wavelength signal, a feedback circulator for feeding back the backward traveling optical signal as a fedback backward traveling optical signal, and an amplifier for amplifying the fedback backward traveling optical signal as an amplified backward traveling optical signal, the amplified backward traveling signal being fed to the nonlinear optical waveguide for canceling the first wavelength signal.

16. The tunable optical local oscillator of claim 15 wherein, the amplifier is a erbium doped optical fiber amplifier.

* * * * *